Sept. 6, 1955 C. E. SMITH 2,716,929
PHOTOGRAPHIC ROLL HOLDER
Original Filed July 25, 1949 4 Sheets-Sheet 1
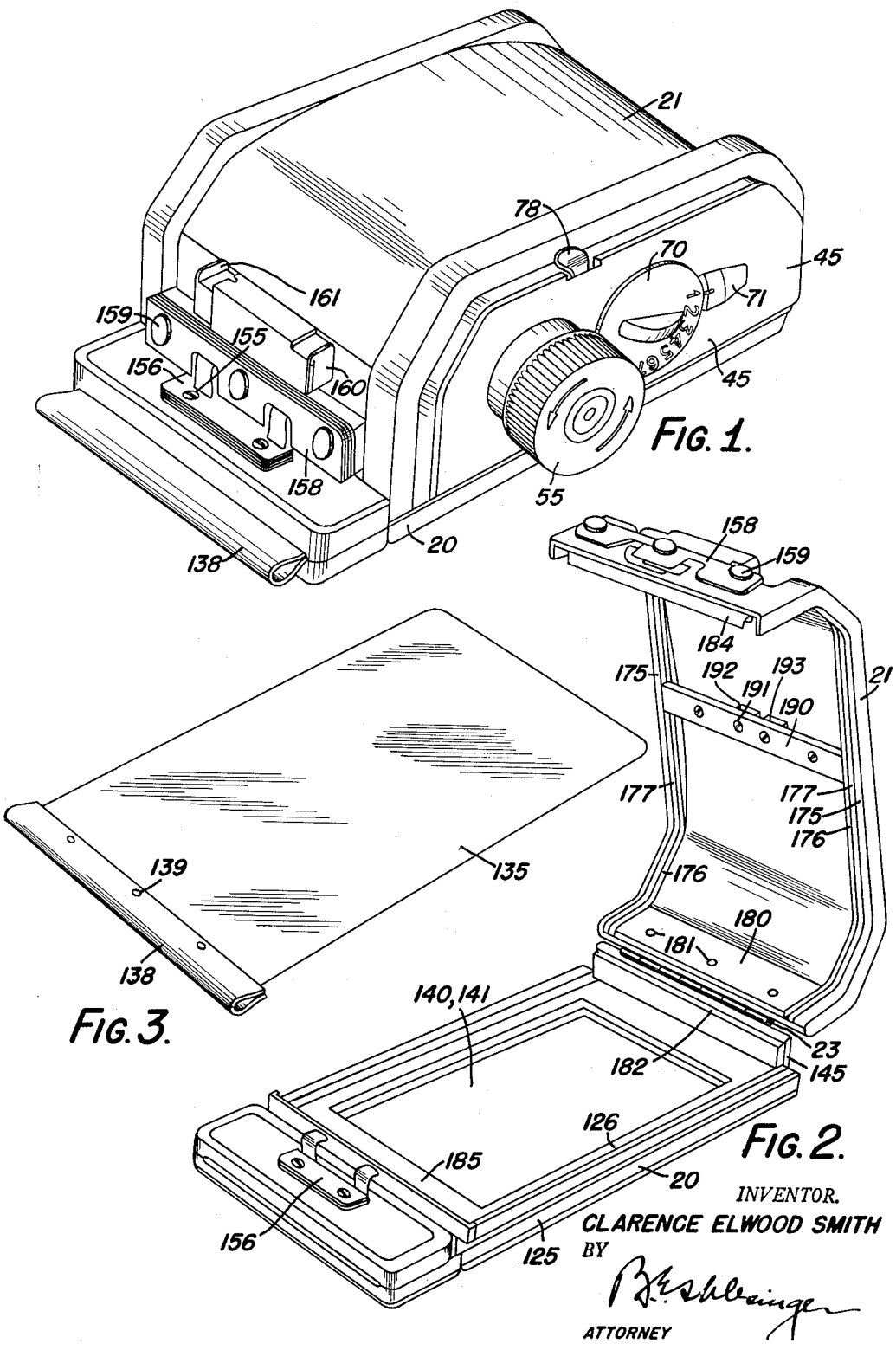
INVENTOR.
CLARENCE ELWOOD SMITH
BY
ATTORNEY Sept. 6, 1955   C. E. SMITH   2,716,929
PHOTOGRAPHIC ROLL HOLDER
Original Filed July 25, 1949   4 Sheets-Sheet 2

INVENTOR.
CLARENCE ELWOOD SMITH
BY
ATTORNEY

Sept. 6, 1955 C. E. SMITH 2,716,929
PHOTOGRAPHIC ROLL HOLDER
Original Filed July 25, 1949 4 Sheets-Sheet 3
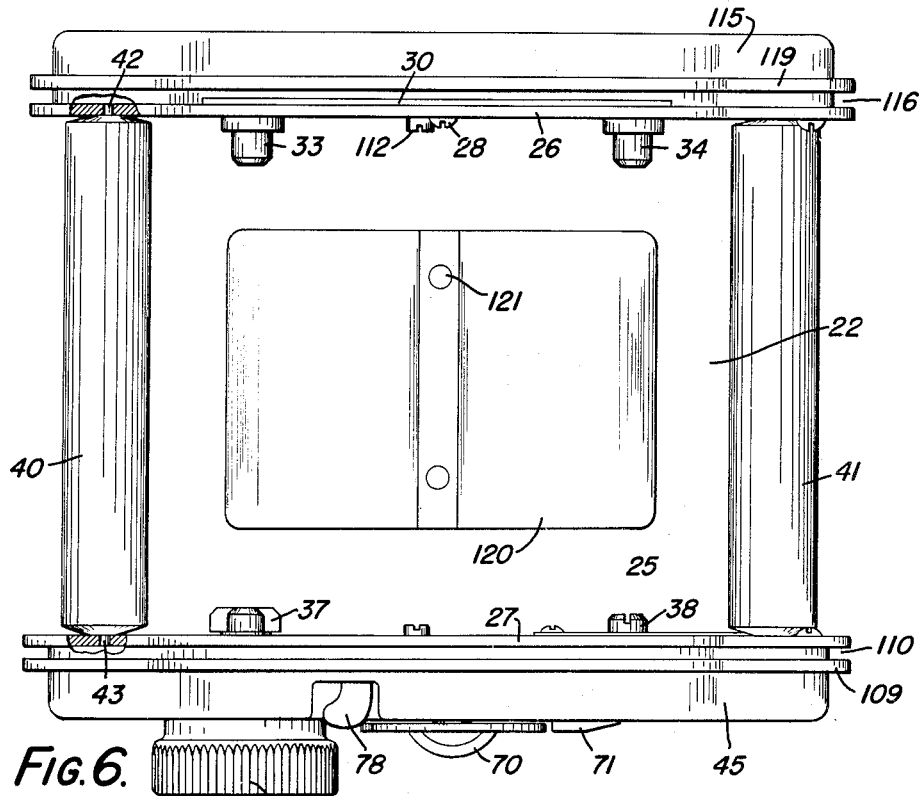
FIG. 6.
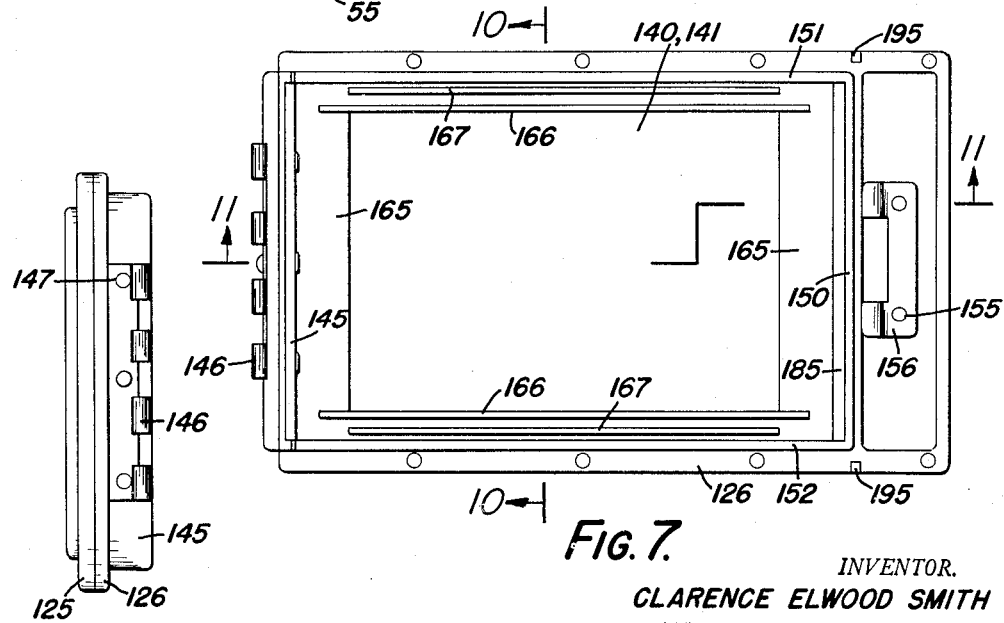
FIG. 7.
FIG. 8.
INVENTOR.
CLARENCE ELWOOD SMITH
BY
ATTORNEY

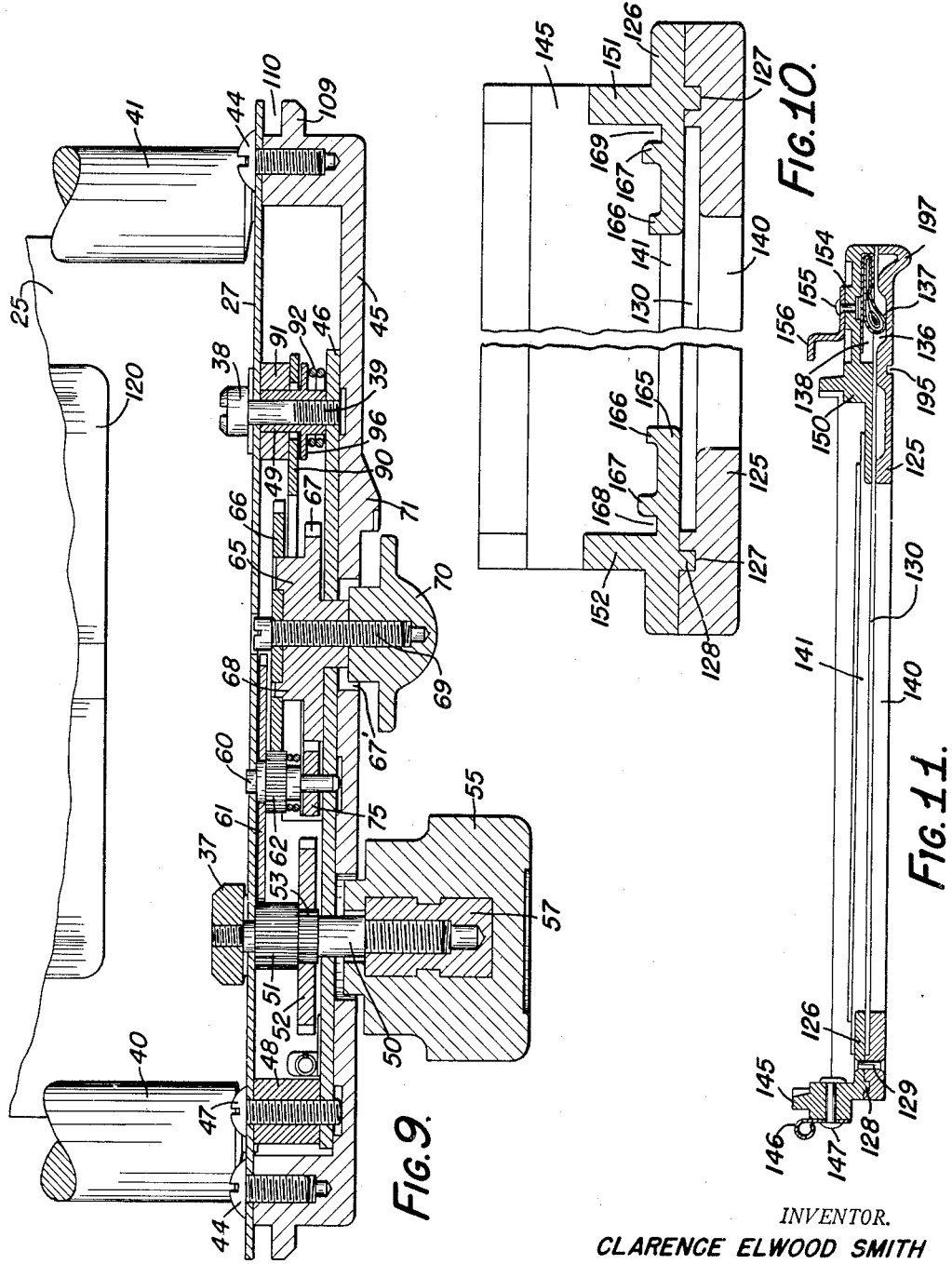

United States Patent Office 2,716,929
Patented Sept. 6, 1955

2,716,929

PHOTOGRAPHIC ROLL HOLDER

Clarence Elwood Smith, Rochester, N. Y., assignor to Graflex, Inc., Rochester, N. Y., a corporation of Delaware Original application July 25, 1949, Serial No. 106,628, now Patent No. 2,588,054, dated March 4, 1952. Divided and this application May 26, 1951, Serial No. 228,488

6 Claims. (Cl. 95—34)

The present invention relates to film holders for use on photographic cameras, and, more particularly to a roll film holder that may be removably mounted on a conventional type of camera equipped with a movable focusing panel. This application is a division of my pending U. S. application Serial No. 106,628, filed July 25, 1949, now Patent No. 2,588,054, issued March 4, 1952.

There are many fine cameras known which are built to use film packs or plate holders. In these cameras, the focusing panel is so connected to the back that it can be moved away from the back, after the camera is focused, to permit insertion between the panel and the back of a film pack adapter, a cut-film magazine or the like. Attempts have been made to make roll film holders which would be suitable for use on such cameras but all, insofar as I know, have been unsatisfactory one way or another. Separate cameras have had to be employed heretofore, therefore, for roll film holders.

One object of the present invention is to provide a roll film holder that can be used on a camera which has a movable focusing panel.

Another object of the invention is to provide a roll film holder in the form of a wholly light-tight package that may readily be attached to or removed from a camera and that when in operating position will hold the film in flat condition at the focal plane of the camera.

Another object of the invention is to provide a roll film holder having a film spool carriage for carrying the supply and take-up spools, which itself may be removed from the film holder, thus providing an easy means of loading film into the roll film holder.

Other objects of the invention are to provide a removable roll film holder which is simple in construction; convenient to use, that is easy to load and unload without scratching or otherwise marring the film surface, and that may readily be attached to or removed from a camera.

Still other objects of the invention will be apparent hereinafter from the specification and from the recital of the appended claims.

In the drawings:

Fig. 1 is an isometric view of a roll film holder constructed according to one embodiment of the invention and showing the holder closed;

Fig. 2 is an isometric view showing the film holder open with the spool carriage removed therefrom;

Fig. 3 is a perspective view of the dark slide used with this holder;

Fig. 6 is a top plan view of the film spool carriage with the film spools removed;

Fig. 7 is a top plan view of the base assembly of the holder, the cover, film spool carriage and dark slide having been removed therefrom;

Fig. 8 is a view of this assembly looking at the left hand end thereof;

Fig. 9 is a fragmentary section of the film spool carriage taken in a plane parallel to the plane of Fig. 6 but on an enlarged scale;

Fig. 10 is a fragmentary section on the line 10—10 of Fig. 7 looking in the direction of the arrows; and Fig. 11 is a section on a somewhat enlarged scale on the line 11—11 of Fig. 7 looking in the direction of the arrows.

Figure 4:
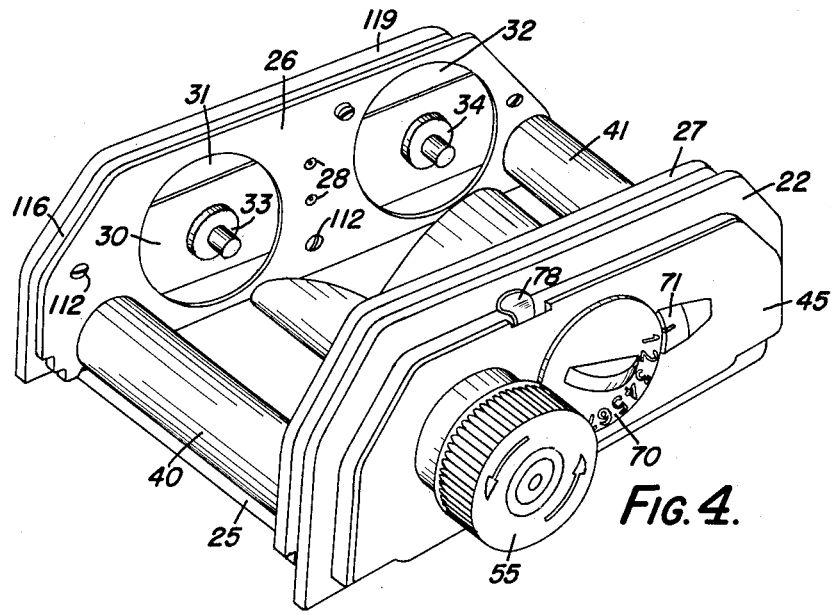
Fig. 4 is an isometric view of the film spool carriage with the film spools removed therefrom.

Referring now to the drawings by numerals of reference, 20 denotes generally the roll holder base; 21 is the roll holder cover; and 22 (Fig. 4) is the film spool carriage. The cover 21 is hinged to the base 20 by means of hinge 23 (Fig. 2). The carriage 22 is adapted to be removably secured between the cover 21 and the base 20, the cover being swingable about its hinge to permit the carriage to be removed from or to be replaced upon the base.

The carriage 22 is in the form of a U-shaped frame having a bottom panel 25 (Figs. 4 and 6) and upstanding side walls 26 and 27. The bottom panel 25 forms a film pressure pad to hold the film in the focal plane of the camera after the carriage is assembled in the roll holder and the roll holder has been attached to the camera.

Secured to the side wall 26 by rivets 28 (Figs. 4 and 6) is a leaf spring 30. The side wall 26 is provided with two spaced circular openings 31 and 32. Mounted upon the spring 30 and in alignment with the openings 31 and 32 are the shoulder studs 33 and 34. Stud 33 forms a bearing for one end of a take-up spool 35 (Fig. 5); and stud 34 forms a bearing for one end of the supply spool 36. The opposite end of the take-up spool is adapted to be connected to and supported by the spool driving key 37 (Figs. 6 and 9). The opposite end of the supply spool is adapted to be carried by the bearing end 38 of a screw 39.

Between the two side walls 26 and 27 are mounted the idler rollers 40 and 41 (Figs. 4, 6 and 9). The idler roller 40 is provided at opposite ends with stud shafts or trunnions 42 and 43 (Fig. 6) that fit into suitable journal holes in the walls 26 and 27, respectively, to rotatably support the roll on the carriage 22. Roller 41 is similarly mounted in the walls 26 and 27.

Attached to the wall 27 of the carriage by machine screws 44 (Fig. 9) is a cover plate 45. Between the wall 27 and the cover plate 45 there is mounted a flat supporting plate 46. This is secured in spaced relation to the side wall 27 of the carriage by means of screws 47 and 39 and the bushings 48 and 49. The bushings 48 and 49 surround the screws 47 and 39, respectively, and are interposed between the side wall 27 and the supporting plate 46.

The plates 27 and 46 form supports for and house between them the film advancing mechanism, the exposure counter mechanism, etc. This is all described in detail and claimed in my parent application Serial No. 106,628 above mentioned and need not be described, therefore, here in detail. Reference will be made here only to those parts shown in the drawings of the present application.

The driving key 37 is carried by a shaft 50 which is journaled in aligned holes in plates 27 and 46. This shaft has a wide-faced spur pinion 51 integral with it; and it has a splined portion 53 upon which is mounted a ratchet wheel 52. The shaft 50 is adapted to be rotated by a knob 55 which has a bushing 57 secured in it that threads onto the outer end of the shaft 50. The cover plate 45 has a recess or aperture in it to receive the inner end of the knob 57.

The plates 27 and 46 serve as supports, also, for a short shaft 60 which is mounted parallel to the shaft 50. This shaft has a gear 61 splined to it and a pinion 62 integral with it. The gear 61 meshes with the pinion 51 of the shaft 50 so that the shaft 60 is rotated on rotation of the knob 55.

Journaled in the supporting plate 46 is a hub member 65 to which there is secured an interrupted spur gear 66. This gear is adapted to mesh with the pinion 62 of shaft 60. It has a portion of its periphery without teeth. Integral with the hub portion 65 is a notched index plate 67. Also integral with the hub member 65 is a cam 68. Secured to the hub member 65 by means of the screw 69 is the counter dial 70. The dial is held against rotation relative to the hub member 65 by a key (not shown). The cover plate 45 has a hole or recess 67' in it to receive the counter dial.

Figure 5:
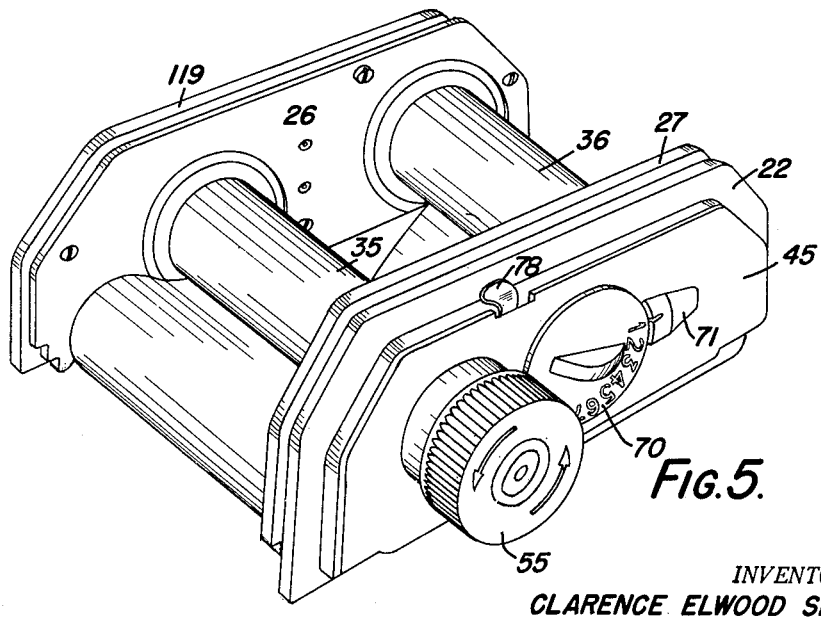
Fig. 5 is an isometric view similar to Fig. 4 but showing the film spools in place and the film wound off of the supply spool for the number 1 exposure.

The counter dial 70 is graduated, as shown in Figs. 1, 4 and 5, in accordance with the number of pictures that may be made from the roll of film adapted to be carried by the film holder. This dial 70 is adapted to read against an indexing mark provided on a lug 71 which is integral with the cover plate 45.

The index plate 67 is provided with a plurality of notches which are spaced unequal distances apart. These notches correspond in number to the number of exposures on the film which is to be used in the camera. They are adapted to be engaged successively by the hooked end (not shown) of a lever 75 that is pivotally mounted on the shaft 60 and that is also shaped to engage the teeth of the ratchet wheel 52. The lever 75 is formed with a projecting end 78 (Figs. 1, 4 and 6) which extends upwardly through a notch in the cover plate 45. By pressing on this projection 78, as has been described fully in my parent application No. 106,628, the lock lever 75 may be disengaged from the ratchet wheel 52 and index plate 67 to permit film transport by rotation of knob 55.

The lock lever 75, as has been described fully in my parent application No. 106,628, not only holds the ratchet wheel 52 and, through it, the film take-up spool 35 (Fig. 5) in any position to which it has been advanced, but prevents accidental movement of the knob 55 in a counter-clockwise direction while any of the exposable part of the film is in position to be exposed.

Secured in any suitable manner to the hub 91 which is rotatable on the bushing 49, is a lever 90. The lever 90 is constantly urged into engagement with the periphery of the cam 68 by a coil spring 92. This spring surrounds the bushing 49 between the plate 46 and a collar 96 that is formed integral with the bushing. One end of the spring is hooked over a lug formed on the plate 46 and the opposite end is anchored in a lug formed on the lever. Lever 90 operates to advance hub member 65 and with it counter 70, and take-up spool 35 to the position of first exposure, all as has been described in my parent application above mentioned. The film advancing mechanism forms no part of the invention claimed herein.

The cover plate 45 is provided with a step or ridge 109 adjacent and parallel to the supporting plate 27 and spaced therefrom. This ridge and the plate 27 bound a recess 110 which is adapted to cooperate with tongues formed in the base of the holder and in the cover of the holder, respectively, to form a light-tight fit between the film carriage, the base, and the cover, as will be described further hereinafter.

Attached to the wall 26 of the carriage by screws 112 (Figs. 4 and 6) is a cover plate 115. The cover plate 115 serves to cover up the outside of the wall 26 and enclose the leaf spring 30. The cover plate 115 is formed with a step or ridge 119 adjacent and parallel to the supporting plate 26. This step 119 and the plate 26 bound a recess or groove 116 that is adapted to receive cooperating tongues on the base 20 and cover 21 to provide a light-tight fit between the film carriage, the base, and the cover as will be described further hereinafter.

To the bottom member or pressure pad 25 of the film spool carriage there is attached a leaf spring 120 (Figs. 4 and 6). This is secured between its ends by means of rivets 121 to the bottom panel 25. The spring member 120 is adapted to contact the peripheries of the two film spools 35 and 36 and provide a slight tension on these two spools.

The base of the film holder is in the form of a casting 125 (Figs. 2, 7, 10 and 11) of suitable shape which is secured to a second casting 126 (Figs. 11 and 7) by rivets 129.

The casting 125 has a rectangular groove 127 (Fig. 10) in it which extends all around it adjacent to but spaced from the outer edges of the casting. Into this groove there fits a projection or tongue 128 formed on the casting 126. The tongue 128 serves to align the two parts of the base and to render the assembly light-tight. The castings 125 and 126 are so made that there is a space 130 provided between them into which the dark slide 135 (Fig. 3) may slide. The casting 125 is provided with a well 136 (Fig. 11), and the casting 126 is provided with a registering recess 138 adapted to receive one end of a conventional light valve 137. The other end of this valve is secured in conventional manner to the casting 126.

The castings 125 and 126 have aligned exposure openings 140 and 141 (Figs. 2, 10 and 11) in them through which the light from the camera may pass to the film in the film holder after the film holder has been secured to the camera and after the dark slide has been removed from the film holder. Light valve 137 prevents any light from following along the dark slide 135 or along the slot 130 which receives the dark slide, and reaching the sensitized film. The dark slide is provided with the usual hand-grip 138 (Fig. 3) which is attached to it in any suitable manner as by means of rivets 139.

One end of the casting 126 is formed with an upstanding rectangular cross member 145 (Figs. 2, 10 and 11). To this upstanding cross member 145 is fastened by means of rivets 147 one part 146 of the hinge 23 by means of which the cover 21 is pivoted to the base.

Integral with the base plate 126 at the opposite end of the same is a similar parallel, upstanding cross member 150. Connecting the two cross members 145 and 150 are two parallel side rails 151 and 152 (Fig. 7).

The base casting 126 has a ledge 165 formed around all four sides of the exposure opening 141. Formed integral with the ledge 165 are parallel film guide rails 166 which extend along both sides of the exposure opening 141 and which support the film in its movement from the supply to the take-up spool. Also formed integral with the ledge 165 is a second set of rails 167 parallel to and higher than the rails 166. Between one of the side rails 167 and the side rails 151 is a groove 169 (Fig. 10); and between the other rail 167 and the side wall 152 is a groove 168. When the film carriage is positioned upon the rails 167 the grooves 110 and 116 (Figs. 6 and 9) of the carriage receive the mating tongues 151 and 152 of the base to form a light-tight fit with the base, and sufficient clearance is provided between the base of the carriage 22 and the rails 166 to permit passage therebetween of the film and its backing paper. The pressure pad 25 at the same time holds the film in flat condition for exposure.

The cover 21 (Fig. 2) is provided on its inside with rails or ledges 175 along its opposite sides. Parallel to each of the ledges 175 and spaced therefrom is a rail or ledge 176. Between each pair of parallel rails 175 and 176 there is thus formed a groove 177. When the cover is closed down, after the film roll carriage 22 is in place on the base 20, the grooves 177 receive the tongues 109 and 119 of the carriage to form light-tight connections between the cover and the carriage.

A strip of suitable resilient material 180 is attached by means of rivets 181 to the cover plate. These rivets serve also to hold the upper section of the hinge 23 to the cover. When the cover is closed the strip 180 fits into the ledge 182 of cross bar 145 of casting 126 to form a light-tight construction. The strip 180 can be made integral with the cover casting 21 if desired.

Attached to the cover casting 21 by any suitable means is a second light guard 184 that cooperates with the step 185 (Fig. 7) of the cross bar 150 to assure a light-tight construction when the carriage 22 is mounted on the casting 126 and the cover 21 is closed.

The cover plate 21 has a flat spring 190 (Fig. 2) secured to it by means of screws 191. The spring is separated from the cover 21 a short distance by blocks 192 and 193 which may be integral with cover 21. Spring 190 serves to hold the film spool carriage in position on the roll holder base by pressing downwardly on the upstanding walls 26 and 27 of the film carriage. This holds the pressure plate 25 of the carriage in contact with the rails 167 (Fig. 10) of the casting 126, but allows the pressure plate 25 to yield to permit passage of thicker portions of the film such as the tape which secures in conventional practice the beginning of the sensitized film strip to the backing paper.

To a suitable boss 154 (Fig. 11) on the base casting 126 is fastened by means of rivets 155 the latch plate 156. This latch plate is adapted to coact with a latch member made up of a series of slides designated generally at 158 (Fig. 1) that are secured to the cover 21 by means of shoulder rivets 159. Certain of the plates, that make up sliding latch member 158, are connected to latch operating members 160 and 161. The cover latch forms no part of the invention and can be any suitable latch that will hold the cover 21 securely in place.

There is a groove 195 (Fig. 11) in the base plate 125 which is adapted to cooperate with a tongue on the rear of body of a conventional camera to prevent light leakage in between the roll film holder and the camera after the roll holder has been mounted upon the back of the camera. There are other grooves (not shown), at right angles to groove 195 to receive other tongues of the camera to hold the holder against sidewise movement on the camera and to further prevent light leakage. A rolled portion 197 is provided on the base 125 to provide a gripping surface for removal of the holder from the camera.

One way in which the roll holder may be mounted upon the camera back is shown in Fig. 10 of the copending U. S. patent application of Robert L. Dalton, Serial No. 110,784, filed August 17, 1949, now Patent No. 2,549,670, granted April 17, 1951.

In use, to load the roll film holder, the film spool carriage 22 is removed from the base member 20 and a fresh roll of film 36 is mounted on and between the studs 34 and 38 (Figs. 5 and 6). The film is then threaded over and around the idler 41, under the pressure plate 25, around the idler 40, and into the take-up spool 35 that is positioned between the stud 33 and the drive key 37. The film is then wound on the take-up spool 35 by means of the winding knob 55 until the indicating arrow that appears on all rolls of film manufactured today, appears. The film spool carriage 22 is then positioned on the base member 20 and the cover 21 is closed over the carriage and latched in place. The dial 70 is then adjusted to the position for the No. 1 exposure. The take-up spool is locked against rotation, when film is in position for exposure, by the locking lever 75. After the first picture has been taken, the photographer presses the projecting portion 78 of the lever 75 to disengage the locking lever. Then he turns the knob 55 to advance the film. The lever 75 will automatically engage the ratchet wheel and stop rotation of feed shaft 50 (Fig. 9) as described in my parent application above mentioned, when the film is in position for the second exposure. Each time that the film is advanced, the counter dial 70 is also rotated to indicate the number of the exposure. So the operation proceeds. When the final exposure has been made, the non-toothed portion of the gear 66 will be in registry with the pinion 62, as described in my parent application above mentioned, and the gear 66 will no longer be turned when the knob 55 is rotated. The film trailer can now be wound on the take-up spool 35. The film holder is then removed from the camera; the cover 21 is opened; the film carriage 22 is lifted out of the holder; the exposed roll of film is removed from the carriage; a new supply roll is positioned therein; the lead end of its film is secured to the take-up spool 35, as before, the film carriage is restored to the holder; and the holder is then reattached to the camera.

As will be seen from the preceding description a roll film holder has been disclosed that is simple to manufacture and simple to operate. Moreover, loading and unloading of the holder can be effected easily.

It will be further understood that while the invention has been described in connection with a specific embodiment thereof, it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. In a photographic film holder, a base having a central exposure opening extending therethrough from the front of the base to the back thereof, said base having a slot therein between the front and back registering with the exposure opening and extending to one side of the base to receive a dark slide, a film spool carriage removably mounted on the base, said carriage comprising a bottom plate constituting a pressure pad, and having parallel side walls extending at right angles to the pressure pad, supporting means journaled in said side walls to rotatably support a film supply spool and a take-up spool, mechanism mounted on the outside of one of said walls for controlling the indexing rotation of the take-up spool, a cover plate secured to the outside of said one side wall to enclose said mechanism, a cover plate secured to the outside of the other side wall, each of said cover plates being so formed that a groove is provided between each cover plate and the adjacent side wall of the carriage around the periphery of the cover plate, a cover hingedly connected at one end to the base and shaped to cover the carriage when the carriage is mounted on the base and the cover is closed thereover, and latch means for securing the cover in closed position, said base being formed with tongues to engage in the portions of said grooves which are contiguous to the base and said cover being formed with tongues which register and interengage with the remaining portions of said grooves when the cover is closed, whereby to form a light-tight fit between base, carriage, and cover.

2. A photographic film holder, comprising a base having a central exposure aperture extending therethrough, and being formed on its inside face with spaced ridges which are parallel to one another and which extend respectively, along opposite, parallel sides of said exposure aperture, a cover hingedly connected at one end to said base, said cover having on its inside surface spaced parallel ridges, a carriage removably mounted on said base and having spaced parallel side walls on the insides of which are mounted axially aligned supports for a film supply spool and axially aligned supports for a film take-up spool, said carriage having a plate extending between its side walls over which the film is fed from the supply spool to the take-up spool, said plate forming a pressure pad to seat film against said exposure aperture, said carriage being formed with grooves around the peripheries of its side walls which are adapted to interengage with the ridges of said base and said cover, and said base having a ledge thereon at one end thereof, and said cover having a resilient member secured thereto at one end thereof to engage said ledge, to form light-tight connections between the carriage, the base, and the cover when the carriage is positioned on the base and the cover is closed down over the carriage, and means for securing the cover to the base in closed position.

3. A photographic film holder, comprising a base having a central exposure aperture extending therethrough, and being formed on its inside face with spaced ridges which are parallel to one another and which extend, respectively, along parallel sides of said exposure aperture, a cover hingedly connected at one end to said base, said cover having on its inside surface two pairs of spaced parallel ridges, each pair of which bounds an intermediate groove, a carriage removably mounted on said base and having spaced side walls on the insides of which are mounted axially aligned supports for a film supply spool and axially aligned supports for a film take-up spool, said carriage having a plate extending between its side walls over which the film is fed from the supply spool to the take-up spool, said plate forming a pressure pad to seat film against said exposure aperture, said carriage having side cover plates secured to the outsides of its side walls, each side cover plate having a peripheral ridge spaced from the adjacent portion of the associated side wall to provide therewith a peripheral groove around the carriage, said peripheral grooves being disposed to register and interengage with the ridges of the base and with the ridges and grooves of the cover when the carriage is mounted on the base and the cover is closed down over the carriage, film transport mechanism mounted between one side cover plate and the associated side wall including a rotatable shaft one end of which carries a key that is disposed to drivingly engage the take-up spool, and a winding knob secured to the other end of said shaft externally of said one side cover plate.

4. A photographic film holder, comprising a base having a central exposure aperture extending therethrough, and being formed on its inside face with spaced ridges which are parallel to one another and which extend respectively, along parallel sides of said exposure aperture, a cover hingedly connected at one end to said base, said cover having on its inside surface two pairs of parallel ridges, each pair of which bounds an intermediate groove, a carriage removably mounted on said base and having spaced side walls on the insides of which are mounted axially aligned supports for a film supply spool and axially aligned supports for a film take-up spool, said carriage having a plate extending between its side walls over which the film is fed from the supply spool to the take-up spool, said plate forming a pressure pad to seat film against said exposure aperture, said carriage having side cover plates secured to the outsides of its side walls, each side cover plate having a peripheral ridge spaced from the adjacent portion of the associated side wall to provide therewith a peripheral groove around the carriage, said peripheral grooves interengaging with the ridges of the base and with the ridges and the grooves of the cover when the carriage is mounted on the base and the cover is closed down over the carriage, film transport mechanism mounted between one side cover plate and the associated side wall including a rotatable shaft one end of which carries a key that is disposed to drivingly engage the take-up spool, and a winding knob secured to the other end of shaft externally of said one side cover plate, a strap spring mounted between the other side cover plate and the side wall associated with said other side cover plate, said other side wall having openings therein, and said strap spring constituting a mounting for the supports for one end of both the film supply spool and the film take-up spool, and said openings constituting apertures through which said last-mentioned supports may project inside of said other side wall.

5. In a photographic film holder, a base having a central exposure opening extending therethrough from the front of the base to the back thereof, said base having a slot therein between the front and back registering with the exposure opening and extending to one side of the base to receive a dark slide, a film spool carriage removably mounted on the base, rotatable supports on the carriage for a supply spool and a take-up spool, said carriage having a bottom plate constituting a pressure pad to seat the film against the exposure opening and over which film is fed from the supply spool to the take-up spool, a pair of rails projecting from the base along the opposite, parallel sides of the exposure opening to support the film in its movement from the supply spool to the take-up spool, a second pair of rails formed on the base parallel to the first pair of rails and projecting further from said base than said first pair of rails to form a seat for the carriage and provide accurate clearance for the passage of film, a cover hingedly connected at one end to the base, and latch means for securing the cover to the base in closed position to hold the carriage on the base, said base and carriage, and said cover and carriage having interengaging portions for preventing light leakage when the cover is closed over the carriage and secured to the base.

6. In a photographic film holder, a base having a central exposure opening extending therethrough from the front of the base to the back thereof, said base having a slot therein between the front and back registering with the exposure opening and extending to one side of the base to receive a dark slide, a film spool carriage removably mounted on the base, rotatable supports on the carriage for a supply spool and a take-up spool, said carriage having a bottom plate constituting a pressure pad to seat the film against the exposure opening and over which film is fed from the supply spool to the take-up spool, a pair of parallel rails projecting from the base along opposite, parallel sides of the exposure opening to support the film in its movement from the supply spool to the take-up spool, a second pair of rails formed on the base parallel to the first pair of rails and spaced further apart than said first pair of rails and projecting further from said base than said first pair of rails to form a seat for said carriage and provide accurate clearance for the passage of film, a pair of grooves formed in the base parallel to said two pairs of rails and spaced further apart than said second pair of rails, tongues formed on said carriage to engage in said grooves to form a light-tight seal between the base and carriage, a cover hingedly connected at one end to said base, said cover having grooves formed internally therein and disposed to interengage with the tongues of said carriage when the cover is closed over said carriage, a ledge projecting upwardly from said base at one end thereof and extending transversely of said rails, a resilient member secured to said cover at one end thereof and also extending transversely of said rails and adapted to fit against said ledge when the cover is closed, to provide light-tight connection between the cover and carriage, a second resilient member secured to the inside of the cover to press on the carriage, when the cover is closed over said carriage, to hold the pressure plate resiliently in position, and means securing the cover to the base to hold the carriage on the base.

References Cited in the file of this patent

UNITED STATES PATENTS

| | | |
|---|---|---|
| 428,797 | Blair | May 27, 1890 |
| 1,695,382 | McCandless | Dec. 18, 1928 |
| 1,832,277 | Caps | Nov. 17, 1931 |
| 2,356,284 | Stockdale | Aug. 22, 1944 |
| 2,450,841 | Moore | Oct. 5, 1948 |